(12) United States Patent
Pedros

(10) Patent No.: US 7,153,429 B1
(45) Date of Patent: Dec. 26, 2006

(54) METHOD OF OPTIMIZING INFLUENT CONDITIONS AND CHEMICAL ADDITION CONTROL FOR BIOLOGICAL DENITRIFICATION

(76) Inventor: Philip B. Pedros, 49 Fairmont Ave., Wakefield, MA (US) 01880

( * ) Notice: Subject to any disclaimer, the term of this patent is extended or adjusted under 35 U.S.C. 154(b) by 11 days.

(21) Appl. No.: 11/281,800

(22) Filed: Nov. 16, 2005

Related U.S. Application Data

(60) Provisional application No. 60/684,068, filed on May 25, 2005.

(51) Int. Cl.
*C02F 3/00* (2006.01)

(52) U.S. Cl. .................. 210/610; 210/614; 210/143; 210/198.1; 210/220

(58) Field of Classification Search ............... 210/739, 210/746, 610, 614, 143, 105, 220, 198.1, 210/205, 611
See application file for complete search history.

(56) References Cited

U.S. PATENT DOCUMENTS

| | | | | | |
|---|---|---|---|---|---|
| 5,482,630 | A | * | 1/1996 | Lee et al. ............... | 210/605 |
| 6,129,104 | A | * | 10/2000 | Ellard et al. ........... | 137/3 |
| 6,163,932 | A | * | 12/2000 | Rosen ................. | 210/605 |
| 6,346,198 | B1 | | 2/2002 | Watson et al. | |
| 7,011,757 | B1 | * | 3/2006 | Reid .................. | 210/605 |
| 2005/0133443 | A1 | * | 6/2005 | Applegate et al. ....... | 210/605 |

* cited by examiner

*Primary Examiner*—Chester T. Barry
(74) *Attorney, Agent, or Firm*—John P. McGonagle

(57) ABSTRACT

A computer controlled system for denitrification of a wastewater stream. The system provides real time analysis of primary parameters effecting both denitrification and nitrification. A computer controlled external source of carbon is added to the treatment process in order to remove nitrates.

10 Claims, 1 Drawing Sheet

METHOD OF OPTIMIZING INFLUENT CONDITIONS AND CHEMICAL ADDITION CONTROL FOR BIOLOGICAL DENITRIFICATION

CROSS-REFERENCE TO RELATED APPLICATIONS

Applicant claims the priority benefits of U.S. provisional Patent Application No. 60/684,068, filed May 25, 2005.

BACKGROUND OF THE INVENTION

This invention relates to waste treatment systems, and in particular, to a method for dose control of liquid treatment chemicals for the removal of nitrogen in wastewater streams.

The removal of nitrogen from wastewater streams is a two step process. In the first step the oxidation of ammonium to nitrate (nitrification) is accomplished by the aerobic growth of chemolithotrophic, autotrophic bacteria in an aerobic environment. The biochemical transformation is described by the following mass based stoichiometric equation, normalized to ammonium.

$$NH_4^+ + 3.30O_2 + 6.708HCO_3^- \Rightarrow 0.129C_5H_7O_2N + 3.373NO_3^- + 1.041H_2O + 6.463H_2CO_3$$

In the second step, organic carbonaceous matter is oxidized by the growth of heterotrophic bacteria utilizing nitrate as the terminal electron accepter (i.e. denitrification). The equation describing the biochemical transformation depends on the organic carbon source utilized. The following is the mass based stoichiometric equation, normalized with respect to nitrate, with methanol as the organic carbon source.

$$NO_3^- + 0.324CH_3OH \Rightarrow 0.226N_2 + 0.591CO_2 + 0.339H_2O + 0.274OH^-$$

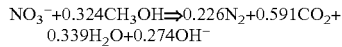

However, nitrification occurs only when the quantity of organic carbonaceous matter has been reduced according to the well-established criterion for the transition from oxidation of organics to nitrification, within the biofloc. The dichotomy of the process is that in order to achieve nitrogen removal a minimum carbon to nitrogen ratio (C/N) is required. Therefore, in order to achieve low levels of total nitrogen in the effluent, external sources of carbon may have to be added to a treatment process in order to remove the nitrates. Optimization of a chemical addition system can be achieved by an automated computer system with real time analysis of primary parameters effecting both denitrification and nitrification. Such a system would reduce the use of chemicals and avoid excess dosing.

SUMMARY OF THE INVENTION

The two primary factors affecting denitrification are the presence of a terminal electron acceptor, (i.e. nitrate) and the amount of organic carbon available. It is well established that the presence of oxygen reduces denitrification. The reason for this is that dissolved oxygen (DO) is the preferential biological pathway for the bacteria. If both oxygen and nitrates are present the biochemical transformation will occur with oxygen as the terminal electron acceptor thereby inhibiting denitrification. The second requirement is the presence of an organic carbon source for the bacteria, with a C/N ratio between 3.5 and 5 providing good nitrogen removal potential.

The present invention provides a computer controlled system for denitirification of a wastewater stream. The present invention is unique for three reasons. First, two parameters in the effluent of the nitrification process are monitored. Second, the DO concentration and the concentrations of nitrates and nitrites in the influent to the denitrification process are monitored. Finally, the quantity of chemical addition required is determined on a mass basis.

These together with other objects of the invention, along with various features of novelty which characterize the invention, are pointed out with particularity in this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF INVENTION

Figure 1:
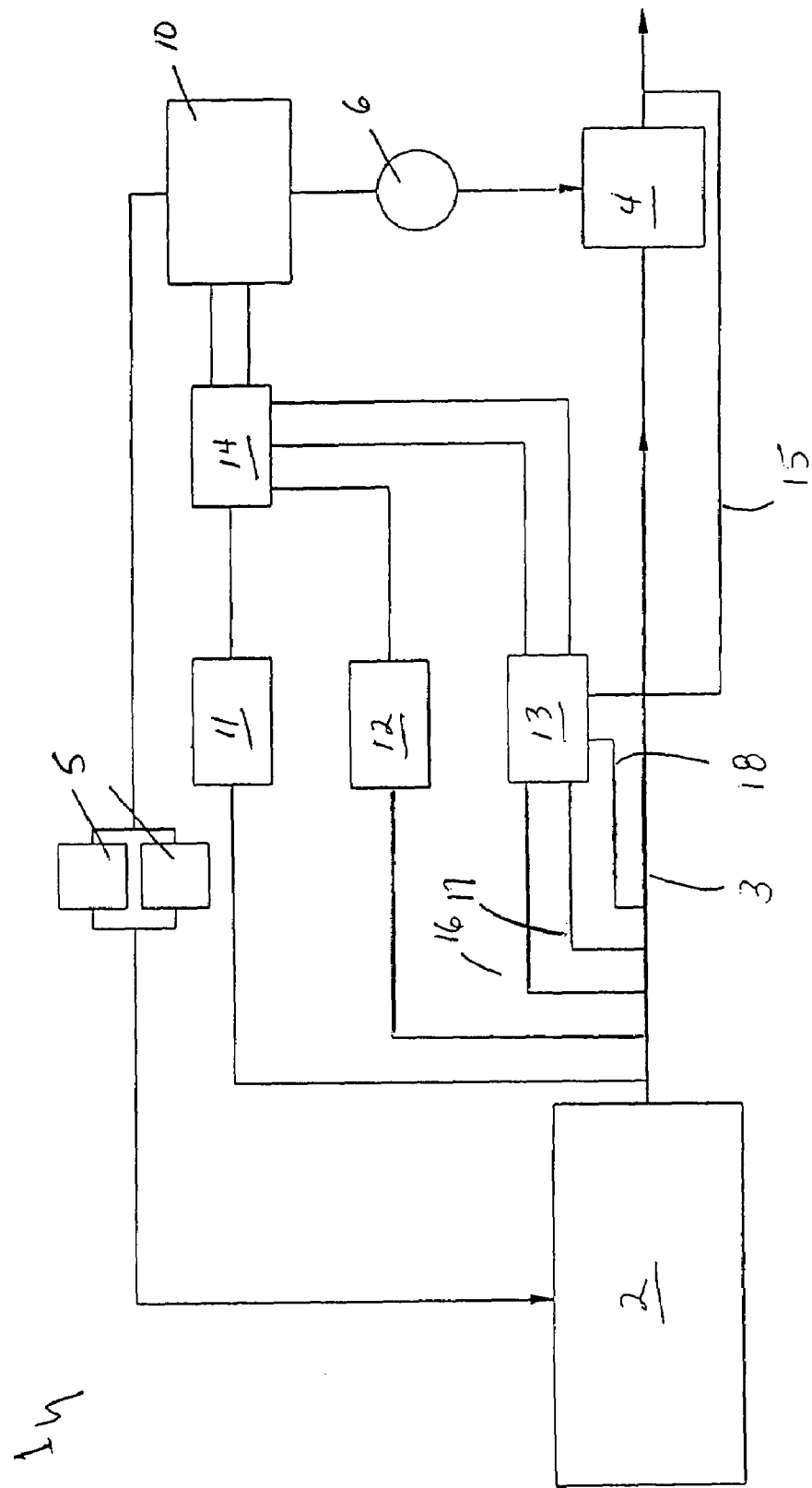
FIG. 1 is a block diagram of a system constructed according to the invention.

Referring to the drawings in detail wherein like elements are indicated by like numerals, there is shown a computer controlled system 1 for denitrification of a wastewater stream. The first step in the treatment of wastewater is to eliminate as far as possible all ammonia-nitrogen in the wastewater. This is done by nitrification, i.e., oxidation of ammonium to nitrate, within an aerobic reactor 2 with an external source of air from air blowers 5. The aerobic reactor 2 then passes a nitrified wastewater stream 3, i.e., influent, to a denitrification reactor 4 for removal of the nitrate-nitrogen content in the influent. The dentrification reactor 4 treats the influent 3 and then passes the denitrified wastewater out for disposal. The process is controlled by a programmable logic controller (PLC) 10.

Nitrification requires dissolved oxygen (DO) within the water. The air blowers 5 provide process air to the aerobic reactor 2. The air blowers 5 are controlled by the PLC 10. The output nitrified wastewater stream 3, which is the influent to the denitrification reactor, is probed and analyzed as it flows to the denitrification reactor 4. One sensor 11 measures the influent flow. A second sensor 12 probes influent DO. A chemical analyzer 13 is also provided for analyzing and measuring influent ammonia-nitrogen 16, influent nitrate-nitrogen 17, influent nitrite-nitrogen 18, and effluent nitrate-nitrogen 15. The outputs from the flow meter 11, DO probe 12 and chemical analyzer 13 are combined and coded in a signal processor 14 and then fed to the PLC 10.

The aerobic reactor 2 should remove substantially all of the ammonia-nitrogen in the original waste stream. If the ammonia-nitrogen content in the influent stream 3 is below a certain designated level, the PLC 10, which controls the air blowers 5, can reduce the air blower outputs to reduce the amount of air, and consequently the DO, being fed into the aerobic reactor 2. By reducing the air blower output to the minimum required for desired nitrification, substantial savings in energy may be obtained. Reducing the DO in the influent stream 3 is also desirable as DO in the influent stream inhibits denitrification.

Dissolved oxygen is required for nitrification but inhibits denitrification; therefore, complete nitrification at the lowest DO possible is preferred so that excess DO is not introduced into the denitrification process. The invention system 1 is designed to monitor both the ammonia-nitrogen and DO concentrations in the effluent of the nitrification process and adjust the aeration system, i.e., air blowers, to improve the influent conditions for the denitrification process, but not adversely affect the nitrification process.

Denitrification requires an organic carbon source. A carbon source is fed into the denitrification reactor 4 by means of a chemical feed pump 6. The chemical feed pump 6 is controlled by the PLC 10. Organic carbon sources may be comprised of methanol, sugar and water, sodium acetate, ethanol, an aqueous mixture of syrup, and the like.

The algorithm used to determine the amount of organic carbon source to be pumped into the denitrification reactor 4 accounts for three parameters: dissolved oxygen, nitrite-nitrogen concentration and nitrate-nitrogen concentration. The basis of the algorithm is an empirically determined equation for calculating the concentration of methanol required. If the carbon source is something other than methanol than the concentration equivalent is determined so that any organic carbon source may be used.

$$C_m = 2.47 \cdot NO_3^- + 1.53 \cdot NO_2^- + 0.87 \cdot DO$$

Where:
$C_m$ = concentration of methanol (mg/l)
$NO_3^-$ = concentration of nitrate (mg/l)
$NO_2^-$ = concentration of nitrite (mg/l)
DO = dissolved oxygen concentration Once the concentration of methanol (or concentration equivalent) is determined, the algorithm determines the mass of chemical required to remove the nitrate-nitrogen. This is an improvement over existing chemical feed systems which examine the flow and influent and effluent nitrate concentrations and use flow as the primary parameter on which to pace the chemical feed pumps. The present invention monitors the difference between inlet and outlet nitrate-nitrogen concentrations as well as influent DO, nitrite-nitrogen and flow and adjust the feed system based on the mass of chemicals required for denitrification.

Nitrite-nitrogen is the first to be denitrified and nitrate-nitrogen the last. The present invention provides an effluent nitrate probe 15 back to the chemical analyzer 13 as a method of fine tuning the entire system and adjust for variations in the quality of the carbon source. The present invention optimizes the denitrification process providing the lowest practical DO and least amount of carbon source from the chemical feed pump.

It is understood that the above-described embodiment is merely illustrative of the application. Other embodiments may be readily devised by those skilled in the art which will embody the principles of the invention and fall within the spirit and scope thereof.

I claim:

1. A computer controller system for denitrification of a wastewater stream, in combination with:
an aerobic reactor having an input adapted to receive a wastewater stream and an output adapted to pass out a nitrified wastewater stream;
an external air blower system providing air to said aerobic reactor;
a denitrification reactor having an input and an output, said input connected to said aerobic reactor and adapted to receive said nitrified wastewater stream, and said output providing means to pass a denitrified wastewater stream out for disposal;
comprising:
a flow meter connected to said nitrified wastewater stream and adapted to measure the flow of nitrified wastewater from said aerobic reactor to said denitrification reactor;
a dissolved oxygen probe connected to said nitrified wastewater stream and adapted to measure dissolved oxygen in said nitrified wastewater;
a chemical analyzer connected to said nitrified wastewater stream and adapted to measure and analyze ammonia-nitrogen content, nitrate-nitrogen content, and nitrite-nitrogen content in said nitrified wastewater, said chemical analyzer connected to said denitrified wastewater stream and adapted to measure and analyze nitrate-nitrogen content in said denitrified wastewater;
a signal processor adapted to receive, combine and encode an output from said flow meter, said dissolved oxygen probe and said chemical analyzer;
a programmable logic controller, said programmable logic controller providing control of said air blower system, said programmable logic controller adapted to receive a signal processor encoded output; and
a chemical feed pump connected to said denitrification reactor, said chemical feed pump containing an organic carbon source, said chemical feed pump being controlled by said programmable logic controller.

2. A system as recited in claim 1, wherein:
said organic carbon source is selected from the group consisting of: methanol, sugar and water, sodium acetate, ethanol, and an aqueous mixture of syrup.

3. A system as recited in claim 2, wherein:
said programmable logic controller is adapted to reduce an air blower system output when said ammonia-nitrogen content falls below a designated level.

4. A system as recited in claim 3, wherein:
said programmable logic controller contains an algorithm to determine the amount of organic carbon source to be pumped into said denitrification reactor, said algorithm being determined by a plurality of parameters, one parameter being said dissolved oxygen content in said nitrified wastewater, another parameter being said nitrate-nitrogen content in said nitrified wastewater, and another parameter being said nitrite-nitrogen content in said nitrified wastewater.

5. A system as recited in claim 4, wherein:
another said parameter is nitrate-nitrogen content in said denitrified wastewater.

6. A method for denitrification of a wastewater stream, comprising the steps of:
providing an aerobic reactor having an input adapted to receive a wastewater stream and an output adapted to pass out a nitrified wastewater stream;
providing an external air blower system providing air to said aerobic reactor;
providing a denitrification reactor having an input and an output, said input connected to said aerobic reactor and adapted to receive said nitrified wastewater stream, and said output providing means to pass a denitrified wastewater stream out for disposal;
providing a flow meter connected to said nitrified wastewater stream, said flow meter adapted to measure the flow of nitrified wastewater from said aerobic reactor to said denitrification reactor;
providing a dissolved oxygen probe connected to said nitrified wastewater stream, said dissolved oxygen probe adapted to measure dissolved oxygen in said nitrified wastewater;
providing a chemical analyzer connected to said nitrified wastewater stream, said chemical analyzer adapted to measure and analyze ammonia-nitrogen content, nitrate-nitrogen content, and nitrite-nitrogen content in said nitrified wastewater, said chemical analyzer being connected to said denitrified wastewater stream and adapted to measure and analyze nitrate-nitrogen content in said denitrified wastewater;

receiving, combining and encoding an output from said flow meter, said dissolved oxygen probe and said chemical analyzer, in a signal processor;

providing a programmable logic controller, said programmable logic controller providing control of said air blower system, said programmable logic controller adapted to receive a signal processor encoded output; and providing a chemical feed pump connected to said denitrification reactor, said chemical feed pump containing an organic carbon source, said chemical feed pump being controlled by said programmable logic controller.

7. A method as recited in claim 6, further comprising the step of:

selecting said organic carbon source from the group consisting of: methanol, sugar and water, sodium acetate, ethanol, and an aqueous mixture of syrup.

8. A method as recited in claim 7, further comprising the step of:

reducing an air blower system output when said ammonia-nitrogen content falls below a designated level.

9. A method as recited in claim 8, further comprising the step of:

determining the amount of organic carbon source to be pumped into said denitrification reactor by means of the measured content of dissolved oxygen, nitrate-nitrogen, and nitrite-nitrogen in said nitrified wastewater.

10. A method as recited in claim 9, further comprising the step of:

determining the amount of organic carbon source to be pumped into said denitrification reactor by means of the measure content of nitrate-nitrogen content in said denitrified wastewater.

* * * * *